Patented Sept. 4, 1951

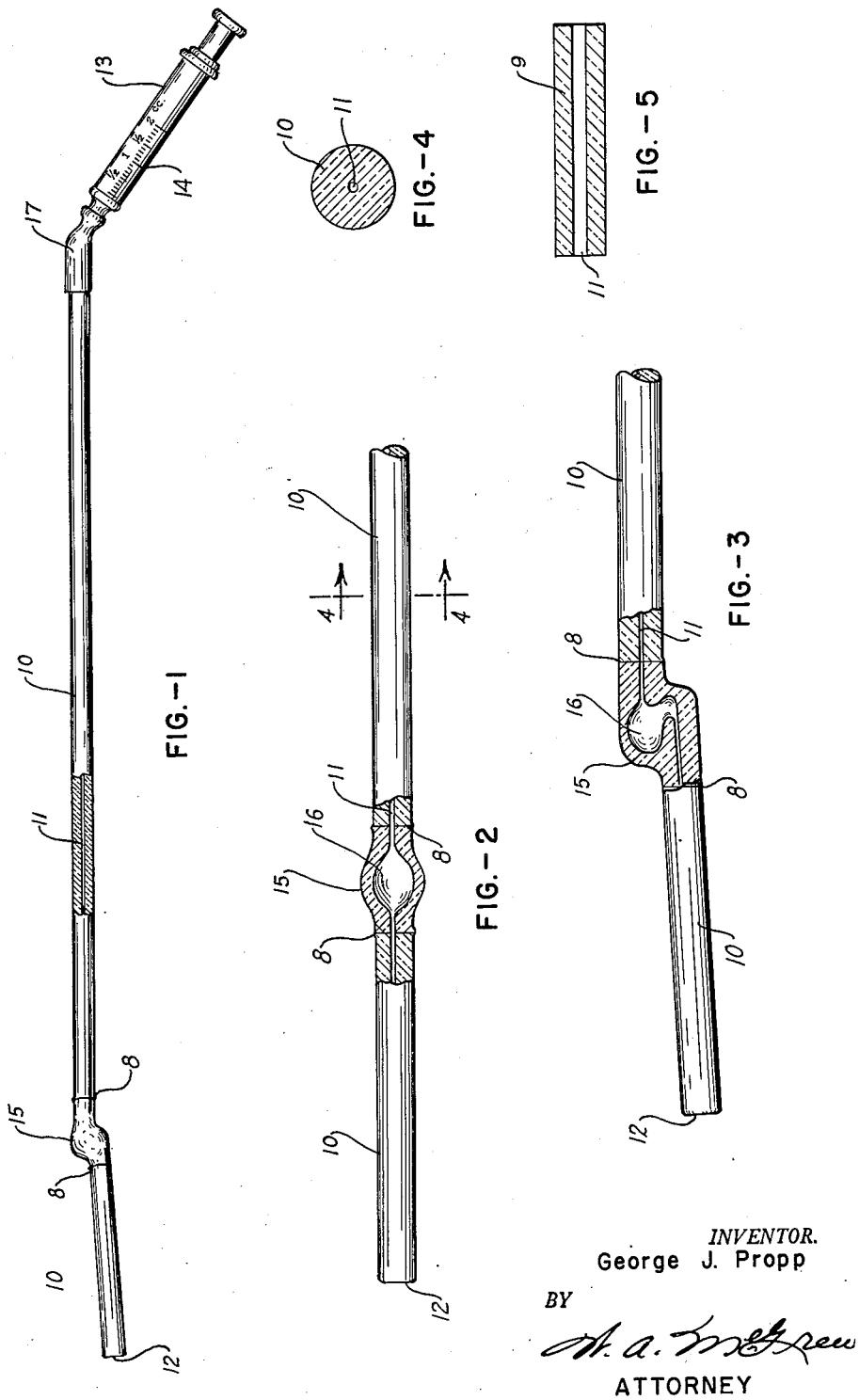

2,566,632

UNITED STATES PATENT OFFICE 2,566,632

ARTIFICIAL INSEMINATION DEVICE

George J. Propp, Loveland, Colo.

Application August 15, 1949, Serial No. 110,251

7 Claims. (Cl. 128—234)

The present invention relates to an artificial insemination device. It has to do particularly with an improved device for use in the artificial insemination of the bovine, especially dairy cattle, although the device may have other uses.

Artificial insemination of cattle has been developed by more or less trial and error methods. The industry is growing rapidly and during the year of 1948 there were approximately one and one-half million cattle inseminated artificially.

There have been various methods employed such, for example, as the use of gelatin capsules and an instrument to expel the capsule into the organ of the female. Later there was an instrument developed which was known as the Kingman Inseminator. Moreover, stainless steel tubing and various sizes of glass capillary tubes have been used. With all of these instruments there were obvious disadvantages and even though each newly developed instrument was designed with a view toward eliminating the defects and faults of its predecessor, there is no instrument on the market at the present time which is wholly satisfactory for the practice of artificial insemination.

The glass capillary tubing is cut in varying lengths and varies in diameter and size of bore or passageway. It has been used by connecting an ordinary glass syringe to the tubing with an adapter of rubber tubing or rubber tubing with a metal adapter. The syringe acts to draw the semen into the capillary tubing and to expel the semen after the instrument has been properly placed. This type of instrumentation is unsatisfactory for the reason that it requires the semen to be drawn through the tubing, through the adapter, into the syringe, and then out through these parts again upon being expelled. This naturally contaminates the syringe for further use and exposes the semen to the filth of the rubber adapter or the rubber-metal adapter. Moreover, such instruments do not permit the discharge of an exact and predetermined amount of semen for the reason that a considerable amount of the semen remains in the capillary tubing after expulsion. Therefore, inaccuracy exists in the amount of semen injected in an animal and considerable waste of semen occurs which is, of course, undesirable.

One of the objects of the present invention is to provide an improved artificial insemination device which entirely overcomes the defects and objectionable features of previously known devices and one which permits the accurate expulsion of a definite and predetermined amount of semen so as to successfully, and without any failure, carry out the artificial insemination of the bovine.

Another object of the present invention is to provide an improved artificial insemination device in which the glass tubing is provided with an enlarged portion which acts as a semen containing chamber or reservoir which is disposed a predetermined distance from the discharge end of the tubing and which makes it possible to discharge the exact quantity of semen required regardless of the position in which the tubing has to be held while placing the semen into the organ of the female animal.

A further object of the present invention is to provide an improved artificial insemination device which includes a length of glass tubing having preferably a predetermined overall diameter of 6 mm. and a bore or passageway having a diameter of preferably 1 mm. in which the tubing is provided with a semen receiving chamber or dome in communication with the bore or passageway but arranged preferably above said bore or passageway so as to maintain a head upon the body of semen and thus insure its total discharge or expulsion when the discharge means of the device is operated.

Another object of the present invention is to provide an improved artificial insemination device formed from a length of glass tubing into which has been set, as by means of a glass weld, a section of glass having a greater diameter than that of the tubing and having a chamber formed therein for receiving a predetermined quantity of semen; another object being to provide a pressure head for the semen to insure its complete discharge regardless of the angle of tilt of the tubing during the application.

A further object of the present invention is to provide an improved artificial insemination device of the foregoing character which comprises preferably a length of glass tubing, in which the device is so constructed and arranged as to require the passage into and out of the tubing throughout only a bare minimum of the length of the tubing, thus eliminating the danger of contamination which was heretofore prevalent in known devices of this general nature.

The foregoing and other objects and advantages of the present invention will appear from the following description and appended claims when considered in connection with the accompanying drawing forming a part of this specification wherein like reference characters designate corresponding parts in the several views.

In said drawing:

Fig. 1 is a side elevational view of one form of improved artificial insemination device embodying the present invention;

Fig. 2 is a fragmentary top plan view of the discharge end of the device showing the enlarged portion providing the semen containing chamber or dome-like reservoir of the device;

Fig. 3 is a view similar to Fig. 1 with the parts sectioned in the area of the enlarged portion or reservoir of the device;

Fig. 4 is an enlarged section taken substantially along the line 4—4 of Fig. 2, looking in the direction of the arrows; and Fig. 5 is a section of tubing from which the dome-like reservoir or chamber of Figs. 1, 2 and 3 is formed.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now to the drawing, the device includes, as shown, a length of glass tubing 10 having a longitudinal bore or passageway 11 formed therein, said bore or passageway extending from end to end of the tubing. The outer or free end of the tubing 10 is preferably blunt or square, as indicated at 12, which enables the operator to get the proper count upon the penetration of the tip to insure the best positioning of the device for obtaining the most effective results. Operators becoming expert with the use of the device may, however, prefer a rounded end or tip rather than the blunt or square end tip. By providing the blunt end or tip 12 for the insertable end of the tubing 10, however, even a novice can successfully use the device. He can count the obstructions upon inserting the tube and thus be sure that the tip extends beyond the fourth obstruction. The best results have been obtained by the use of a piece of tubing which has an overall diameter of approximately 6 mm. and with a bore or passageway having a diameter of approximately 1 mm.

At the opposite end of the tubing 10 there is attached means for drawing semen into the free end of the tubing and for discharging or expelling it therefrom. Any desirable means may be provided for this purpose. As seen in Fig. 1, I have provided the outer end of the tubing 10 with an ordinary or conventional plunger type glass syringe 13 which, as shown, is graduated at 14 but which may be plain, if desired. The syringe is preferably attached to the tubing by an adapter 17.

In accordance with the present invention, the glass tubing 10 is provided with an enlarged portion, indicated as a whole at 15. This portion may be formed from a short length of glass tubing 9 (Fig. 5) or a gob of glass which may be blown into the desired shape by a glass blower and set into the length of glass tubing 10 and held thereto as an integral part thereof by means of a glass weld, indicated at 8 in Figs. 1, 2 and 3. The enlarged portion providing the dome-like chamber 16 is preferably spaced three inches inwardly from the free or insertable end 12 of the tubing, although this distance may vary from between three inches to three and one-half inches from the outer or free end 12 of the tubing. It will be noted, see particularly Figs. 1 and 3, that the dome-like reservoir 16 is disposed above the bore or passageway 11 and in communication with it. Thus, when the syringe 13 is operated and semen is drawn into the tubing 10, it will flow into the chamber 16, substantially filling the same and will create a head on the semen, insuring its complete and total discharge when the syringe plunger is actuated to discharge or expel the semen from the device. By virtue of the fact that the chamber containing the semen is above or at one side of the passageway, it will be understood that the tubing 10 may be tilted upwardly or downwardly so as to gain the proper position for application of the semen, and that regardless of the angularity of the tubing, there will be a head upon the semen which will cause its complete and total discharge, once the syringe is actuated.

The size of the cavity or dome-like chamber 16 may vary but it has been found desirable that this space or chamber have a capacity of about 1 cc. of semen, this being the proper amount for insertion in the animal.

While it has been suggested above that the enlarged portion 15 has been formed from glass by a blowing process and that the section comprising the enlargement is set into the tubing and secured by a glass weld, it may prove desirable to provide a separate chamber, preferably formed from glass, which is set or mounted upon the tubing in substantially the same place as is the enlargement 15, with a bore formed through the top wall of the tubing to connect the attached chamber with the longitudinal bore or passageway 11. Such a chamber would provide means similar to that shown which would function in the same manner as the device illustrated in the accompanying drawing, the purpose being the same, namely to permit the loading of the device with a predetermined quantity of semen all of which would be discharged when desired. This is made possible by virtue of the fact that the dome-like chamber serves the purpose of providing a head on the semen.

The device of the present invention has many sanitary advantages over all previously known instruments of this general class and it is to be noted that the semen has to travel only the short distance from the tip or outer end 12 to the chamber 16 and back in order that one injection may be made. The semen never enters that portion of the bore or passageway extending from dome-like chamber 16 to the syringe and naturally it does not enter the syringe. Therefore, since it is desirable to sterilize the device or instrument prior to or after each use thereof, this may be accomplished by merely subjecting the forward end portion of the tubing, including the enlarged portion 15, to the sterilization treatment.

The enlarged portion 15 may, if desired, be in the form of a so-called one-sided bubble which is large enough to hold approximately 1 cc. of semen. It is shaped in such a way that the capillary bore 11 will be disposed in the base of the bubble, thus insuring the complete expulsion of the semen even though the inserted end 12 should happen to be tipped upward, or otherwise than in a substantially horizontal plane.

As stated above, the semen does not pass along the capillary bore 11 beyond the bubble or chamber 16, thus there can be no danger of contamination by the syringe 13 or the rubber or rubber-metal adapter 17 of Fig. 1. Since the semen does not come in contact with the syringe or adapter, the operator may use the same syringe with any variety of semen without the danger of contamination. Moreover, by virtue of the present construction and arrangement of the parts, there is no semen residue in the capillary bore 11 following expulsion, thus increasing the accuracy and efficiency of the device over previously known devices of this general nature. Furthermore, the present device eliminates the unnecessary exposure of semen to sunlight through the heavy glass walls of the tubing 10. It also eliminates the danger from excessive cold temperatures and of freezing.

While I have referred to the use of glass tubing 10 as being preferable, it may prove desirable to substitute some sort of plastic material for the glass tubing; or some suitable metal tubing might also be used in lieu of the glass.

I claim:

1. An artificial insemination device, comprising a length of glass tubing having a passageway extending longitudinally thereof, a syringe attached to one end of the tubing, the other end being blunt, said tubing having an enlarged portion adjacent the blunt end forming an unobstructed hollow semen receiving compartment in communication with and disposed above the longitudinal passageway to provide a head for a predetermined quantity of semen.

2. In an artificial insemination device, a length of glass tubing having a passageway extending longitudinally thereof, one end of the tubing being open and having a blunt outer tip portion, a semen receiving compartment formed in the tubing and located approximately three inches inwardly from the blunt end and being in open communication with the passageway and above the same whereby to provide a head for the semen, and means at the opposite end of the tubing and remote from said compartment for drawing semen into the compartment and for discharging the same through said blunt end of the tubing.

3. Structure according to claim 2, wherein the means comprises a glass syringe.

4. An inseminator for practicing the artificial insemination of cattle, comprising a length of glass tubing having an overall diameter of approximately 6 mm. said tubing having a longitudinal passageway extending therethrough, said passageway having a diameter of approximately 1 mm., the tubing having an enlarged portion adjacent its discharge end providing a semen receiving chamber in communication with the passageway and disposed at one side thereof, said chamber having a capacity of approximately 1 cc., and means at the opposite end of the tubing for drawing semen into said chamber to fill the same and for discharging the semen through the opposite end of the tubing.

5. An artificial insemination device, comprising a length of glass tubing having a passageway extending longitudinally thereof from end to end, said tubing having an enlarged portion adjacent one end thereof providing a chamber for receiving a predetermined quantity of semen, and means disposed at the opposite end of the tubing and remote from said chamber for filling the chamber with semen and for discharging the entire quantity of the same through the end of the tubing adjacent said enlarged portion.

6. A device according to claim 5, wherein said means is a glass syringe.

7. A device according to claim 5, wherein said means is a graduated glass syringe.

GEORGE J. PROPP.

REFERENCES CITED

The following references are of record in the file of this patent:

UNITED STATES PATENTS

| Number | Name | Date |
|---|---|---|
| 25,409 | Hart | Sept. 13, 1859 |
| 319,296 | Molesworth | June 2, 1885 |
| 754,015 | Ryan | Mar. 8, 1904 |
| 772,450 | Wulfing-Luer | Oct. 18, 1904 |
| 1,118,040 | Mulder | Nov. 24, 1914 |
| 1,711,352 | Jeffreys | Apr. 30, 1929 |

FOREIGN PATENTS

| Number | Country | Date |
|---|---|---|
| 532,459 | France | Feb. 4, 1922 |